(12) United States Patent
Land, III

(10) Patent No.: US 7,965,486 B2
(45) Date of Patent: Jun. 21, 2011

(54) ARC FLASH DETECTION SYSTEM

(75) Inventor: H. Bruce Land, III, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 707 days.

(21) Appl. No.: 11/877,852

(22) Filed: Oct. 24, 2007

(65) Prior Publication Data

US 2008/0094612 A1    Apr. 24, 2008

Related U.S. Application Data

(60) Provisional application No. 60/877,344, filed on Dec. 27, 2006, provisional application No. 60/853,992, filed on Oct. 24, 2006.

(51) Int. Cl.
 *H02H 3/00* (2006.01)
(52) U.S. Cl. ............................. 361/115; 361/42; 356/51
(58) Field of Classification Search .............. 361/2, 42, 361/78; 250/372, 336, 200, 370.11
See application file for complete search history.

(56) References Cited

U.S. PATENT DOCUMENTS

| | | | |
|---|---|---|---|
| 4,223,364 A | | 9/1980 | Sangster |
| 4,658,322 A | | 4/1987 | Rivera |
| 4,823,224 A | | 4/1989 | Hagerman et al. |
| 5,910,872 A | * | 6/1999 | Marmonier et al. ............. 361/2 |
| 6,426,503 B1 | * | 7/2002 | Wuest ............................ 250/372 |
| 6,995,640 B2 | | 2/2006 | Harmon et al. |
| 2003/0172744 A1 | * | 9/2003 | Matsuzawa et al. ........ 73/861.42 |
| 2004/0200975 A1 | * | 10/2004 | Brown et al. .................. 250/372 |
| 2006/0067018 A1 | | 3/2006 | Malkowski |
| 2007/0014060 A1 | * | 1/2007 | Land et al. ...................... 361/42 |

\* cited by examiner

*Primary Examiner* — Jared J Fureman
*Assistant Examiner* — Angela Brooks
(74) *Attorney, Agent, or Firm* — Aisha Ahmad

(57) ABSTRACT

An arc flash detection system includes a sensor for determining and responding to the presence of an arc flash condition in electrical equipment by detecting a pressure rise, rate of pressure rise and/or ultraviolet radiation characteristic of an arc flash, and generating a signal in response thereto; and processing means responsive to said signal for operating a protective system to de-energize the electrical equipment within a period of time of sufficiently short duration to prevent a pressure wave from the arc flash from causing unacceptable darn age to equipment or personnel.

13 Claims, 5 Drawing Sheets

ARC FLASH DETECTION SYSTEM

CROSS-REFERENCE TO RELATED APPLICATIONS

This application claims the benefit of U.S. Provisional Application No. 60/853,992 filed Oct. 24, 2006, and U.S. Provisional Application No. 60/877,344 filed Dec. 27, 2006, the contents of both of these applications being incorporated herein by reference.

BACKGROUND OF THE INVENTION

1. Field of the Invention

The present invention is directed to a system for detecting incipient arc flash conditions.

2. Description of the Related Art

Arc flash is an extremely dangerous, and sometimes lethal, condition arising in electrical equipment wherein an electrical current short circuits across all air gap between conductors. Arcing can occur because of insulation failure, contacting a test probe to the wrong surface, or because of an accidental slip of a tool, etc. Low voltage (e.g. less than 240 volts) and low amperage (e.g., less than 1,000 amps) circuits present negligible risk of arc flash. However, with electrical circuits operating, for example, at several hundred volts and several thousand amps, the energy radiated by an arc flash can be several megawatts. In an arc flash the air becomes ionized, ad metal components are vaporized and blasted outward. Vaporized metal expands to 67,000 times the volume of solid metal and maintains the arc until the circuit is opened. The energy of the arc can create a plasma fireball at a temperature of 20,000° C., four times the temperature of the surface of the sun, which explodes outward, carrying with it bits of molten metal, loose pieces of equipment, and other debris. Personnel within the blast radius can be blown off their feet, suffer broken bones, and punctured organs. The arc flash can ignite clothing and cause burns almost instantaneously which may take months to heal. The intense ultraviolet radiation (U) from the flash can cause damage to the eye. A single arc flash incident can cause millions of dollars of damage to personnel and equipment within a fraction of a second, in addition to the pain and suffering of personnel injured by the flash, as well as their families.

One of the ways to mitigate the risk of damage and injury is by the use of protective clothing, by restricting work on energized equipment, and procedures mandated by regulatory agencies.

However, use of protective gear which fully encloses the personnel makes it difficult to perform maintenance operations. Moreover, maintenance may need to be performed on energized equipment.

An arc flash is terminated by opening the electric circuit to cut off the energy supply. The longer it takes to open the circuit the more energy and damage is propagated by the arc flash. What is needed is a system and method for detecting incipient arc flash conditions and responding thereto in sufficient time to de-energize the circuit before major damage has occurred. By "incipient arc flash" is meant that the arc flash has not progressed to the level of causing extensive damage. Typically, an arc flash is considered incipient if it has not progressed for more than a few milliseconds.

SUMMARY OF THE INVENTION

An arc flash detection system is provided herein. The arc flash detection system comprises: (a) a sensor for determining and responding to the presence of an are flash condition in electrical equipment by detecting a pressure rise exceeding 0.01 psi or a rate of pressure rise characteristic of arc flash, and/or ultraviolet radiation characteristic of an arc flash, and generating a signal in response thereto; and (b) processing means responsive to said signal for operating a protective system to de-energize the electrical equipment within a predetermined period of time.

BRIEF DESCRIPTION OF THE DRAWINGS

Various embodiments of the invention are described herein with reference to the drawings wherein.

DESCRIPTION OF THE PREFERRED EMBODIMENTS

Figure 1:
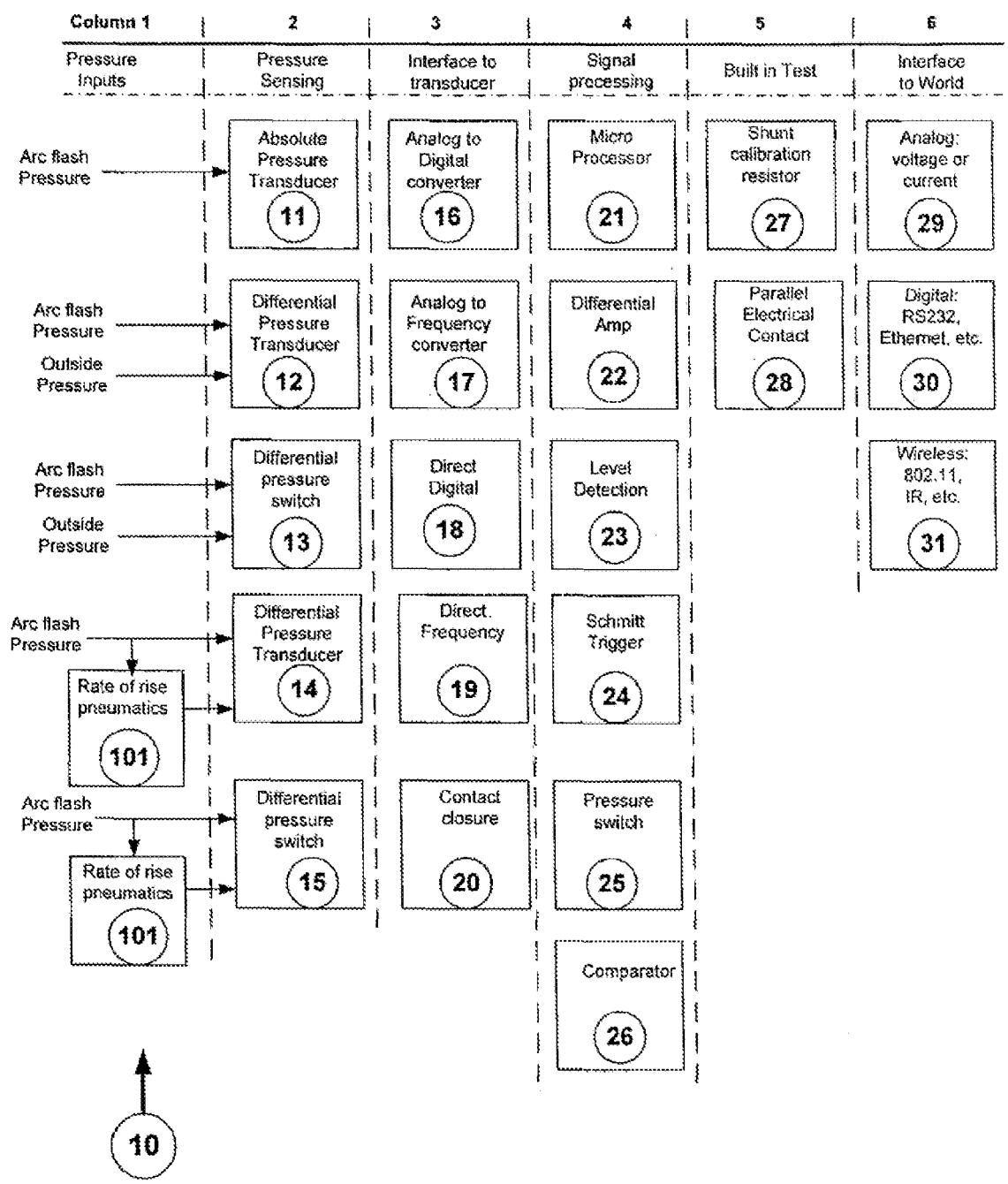
FIG. 1 is a schematic diagram illustrating a system for detecting an arc flash.

Referring now to FIG. 1) in one embodiment of the invention a system 10 is provided for detecting the pressure increase in the vicinity of an arc flash at a level well below that needed to blow the cover panels off electrical equipment, such as a switch board. The arc flash omits a burst of heat and light radiation which heats the air and thus raises the air pressure. This is followed by a pressure wave traveling at about the speed of sound which can attain pressure levels exceeding 40 to 50 psi, depending upon the power feeding the arc. This can easily amount to tons of pressure on a cabinet door which can rip the door off its hinges. The system 10 is adapted to detect a pressure wave from an arc flash exceeding 0.01 psi above atmospheric, or ambient pressure. The system 10 is adapted to send a signal within 1 to 2 milliseconds to a circuit breaker to cut off power to the circuit. The system includes pressure sensors (listed in column 2 of FIG. 1 under "Pressure Sensing"); interfaces between the pressure sensors and a signal processor (listed in column 3 under "interface to transducer"); signal processors (listed in column 4 under "signal processing"); testing means (listed in column 5 under "Built in Test"); and interfaces to arc flash suppression means (listed in column 6 under "Interface to World").

More particularly, there are several ways to use pressure sensing to detect incipient arc flash. A pressure sensor is used to detect pressure rise inside of an enclosure as a means of protecting equipment and personnel against arc flash. The pressure sensor needs to detect pressure change as low as 0.01 psi to allow reaction before the pressure can build up enough to breach the integrity of the switchboard.

In a first method arc flash pressure is measured directly with an absolute pressure transducer. However, since barometric pressure is always changing, the absolute pressure sensor will change with the barometric pressure. To detect arc flash the absolute pressure transducer must be coupled with a fast microprocessor which continually measures the pressure. The microprocessor includes a clock and calculates the rate of pressure increase. Barometric pressure changes are slow. However, if the microprocessor detects an increase of pressure at a rate which exceeds a predetermined threshold value, an arc flash is indicated. Typically, a rate of pressure increase (Δpsi/millisecond) of above about 0.05 psi/ins is indicative of all arc flash condition.

Alternatively, a differential pressure sensor, e.g., a pressure transducer 12 (either digital or analog) or a differential pressure switch 13 can be used to detect the difference between the air pressure inside an enclosure and that outside the enclosure. If the pressure inside the enclosure exceeds the outside pressure by a predetermined threshold (e.g., 0.0 psi) the presence of an arc flash is indicated. Typically, pressure ports are required for the pressure sensor to have access to the air pressure inside the equipment compartment and outside the equipment compartment for comparison.

An additional embodiment of the invention couples a rate of rise pneumatic circuit with a differential pressure transducer 14 or differential pressure switch 15 to detect pressure rise within an enclosure without reference to outside air pressure.

Figure 2:
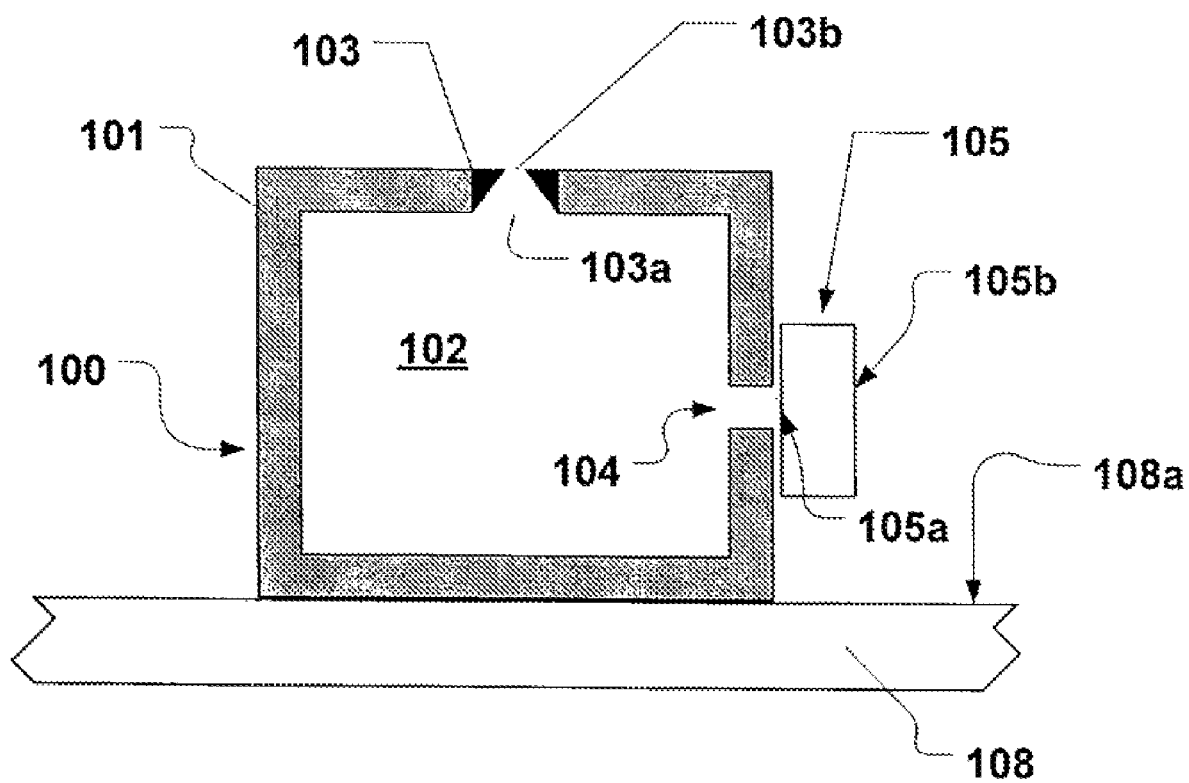
FIG. 2 is a schematic illustration sensor for detecting a pressure differential.

Referring now to FIG. 2, sensor apparatus 100 for detecting the presence of incipient arc flash includes a housing 101 enclosing an interior chamber 102 and having a first orifice 103 and a second orifice 104. The housing 101 is mounted to the interior surface 108a of a compartment 108 in which electrical equipment is housed. First orifice 103 is funnel shaped with the wide end 103a of the orifice 103 opening toward the interior chamber 102 and the narrow end 103b of the orifice 103 opening toward the interior of the equipment compartment. The orientation and conical shape of the orifice allow the air inside the chamber 102 to exit faster than air can enter it. This means that in the event of a sudden increase of air pressure inside the equipment compartment but outside housing 101, there will be a time lag before the air pressure can reach equilibrium inside and outside of chamber 102.

Second orifice 104 is larger and has a substantially uniform cross section. A differential pressure sensor 105, which can be a differential pressure transducer or differential pressure switch, is mounted at the exterior end of the second orifice 104. A first side 105a of the differential pressure sensor 105 is at the pressure of air inside the chamber 102. A second side 105b of the differential pressure sensor 105 is at the pressure of air inside the equipment compartment 108 but outside the housing 101.

Slow changes of barometric pressure do not cause a significant pressure differential because the air pressure inside the chamber 102 has time to equalize with the air pressure in the equipment compartment. However, in the event of an arc flash, air pressure inside the equipment compartment 105 will exceed the air pressure inside chamber 102. Thus the differential pressure sensor 105 will detect a pressure difference. If the pressure difference exceeds a predetermined threshold (e.g., 0.01 psi) an arc flash is indicated.

The advantage of the sensor apparatus 100 is that is can be mounted inside the equipment cabinet 108. An air pressure port through the side wail of the equipment cabinet is not required because the pressure differential is not measured with respect to ambient air pressure outside of the equipment cabinet.

Referring again to FIG. 1, as can be seen, various means of pressure sensing are listed in column 2. Likewise various interface means may be employed to transmit signals from the pressure sensing device to a signal processor. If the pressure sensor is an analog device, an analog to digital converter 16, or an analog to frequency converter 17 may be employed. Alternatively, if the sensor is a digital device or frequency generating device the signal may be conducted directly to a signal processor such as by direct digital transmission 18 or direct frequency transmission 19.

In yet another alternative, the pressure sensor can effect contact closure 20 of a pressure switch 25.

In yet another embodiment as listed in column 4 of FIG. 1, the signal processing can be performed by any of several methods or types of equipment: a microprocessor 21, a differential amplifier 22, by level detection 23, a Schmitt trigger 24, pressure switch 25 or a comparator 26. In the case of 21a microprocessor is used to rapidly sample the time varying analog output from the analog pressure transducer 11, 12, or 14. This may be done by the use of an analog to digital converter in the microprocessor or via a separate analog to digital interface circuit such as 16, 17, or 19. Each reading is compared to the previous readings. If the reading exceeds the ordained threshold the presence of an arc flash is recognized and the microprocessor sends an appropriate signal to open the appropriate circuit breaker.

Item 22 uses a differential amplifier to determine when the analog output voltage from the pressure transducer exceeds a threshold value. A reference voltage is placed on one input to a differential amplifiers and the analog voltage output from the arc flash pressure sensor is placed on the other input. Anytime the arc flash voltage exceeds the reference voltage the differential amplifier will greatly amplify the difference and produce a signal that can be interfaced to open the appropriate circuit breaker.

Alternatively, if the transducer or its inter-face circuit produces an output whose frequency varies with pressure then a digital circuit can be constructed to produce and output, whenever the output frequency exceeds a threshold level 23.

Alternatively, if the pressure transducer is a pressure switch the output may contain considerable noise that would produce erratic performance. The pressure switch output would be connected to a Schmitt Trigger circuit that will output a single output transition once the pressure switch begins to close and will filter out any contact bounce in the pressure switch.

A comparator 26 encompasses any means by which an unknown signal from a transducer, be it an analog or frequency signal, is compared to a reference signal such that an output is produced when the unknown signal exceeds that of the reference signal.

Optionally, the output from a pressure switch can be connected directly to a digital input of a microprocessor 21 and the microprocessor allowed to sample the input at a high rate of speed. Once the microprocessor determines that the switch has remained closed for a predetermined time the microprocessor would open the proper circuit breakers. Additionally, the pressure switch 13 or 15 could have their contact closure 20 directly interfaced 25 to the breaker via analog 29, or digital 30, 31 means.

Optionally, a built-in testing means listed in column 5 such as a shunt calibration resistor 27 or a parallel electrical contact 28 can be employed. Most pressures transducers that produce an analog voltage output are based upon the use of positioning several sensing elements in the well known Wheatstone bridge configuration. The strain on a diaphragm produces a change in resistance in one or more of the four legs of the Wheatstone bridge. This resistance change is proportional to pressure. If a fixed resistance of a known value is electrically connected in parallel (shunt a portion of the circuit) with one or more of the legs of the bridge it will cause the transducer to produce an output signal identical to a known pressure. This test connection is easy to accomplish via a microprocessor. It will allow testing and calibration of the transducer and its interface and is called shunt calibration 27. Most analog pressure transducers can be manufactured with a shunt calibration feature.

Pressure switches contain a diaphragm that moves against a spring, closing a contact and producing a single go/no-go output. Tins output is not amenable to shunt calibration. If this case a remotely operated electrical contact 28 is placed in parallel to the pressure switch contact. While this does not test the pressure switch, it does test the sensor interface and signal processing.

Finally, an interface such as by analog voltage (0-5V, 1-5V, etc.) or current transmission (4-20 ma, etc.) 29, digital (RS232, 1(485, contact closure, Ethernet, etc.) 30, or wireless (e.g., 802.11, radio frequency, Infra red, etc.) transmission 31, can be employed for communication with control equipment which effects de-energizing of the electric circuit feeding power to the arc flash. For example, circuit breakers can be used to open the circuit.

The response time of these sensors must be less that a millisecond to detect the phenomena of interest well before any damage occurs. However, the system must be sufficiently selective, for example by optionally including delay features) to distinguish arc flash in various background conditions. For instance, the pressure sensing system must ignore any pressure surges created by the blast from the arc chutes of an air circuit breaker (typically less than 40 ms) and yet operate correctly in the presence of an arc flash. Switchboards containing vacuum breakers do not require such a delay. The larger an arc flash the faster the pressure rise and each of these pressures sensing techniques operates faster with the creation of a larger arc. Therefore the system must incorporate adjustable delay features to allow for various field conditions and applications.

Figure 3:
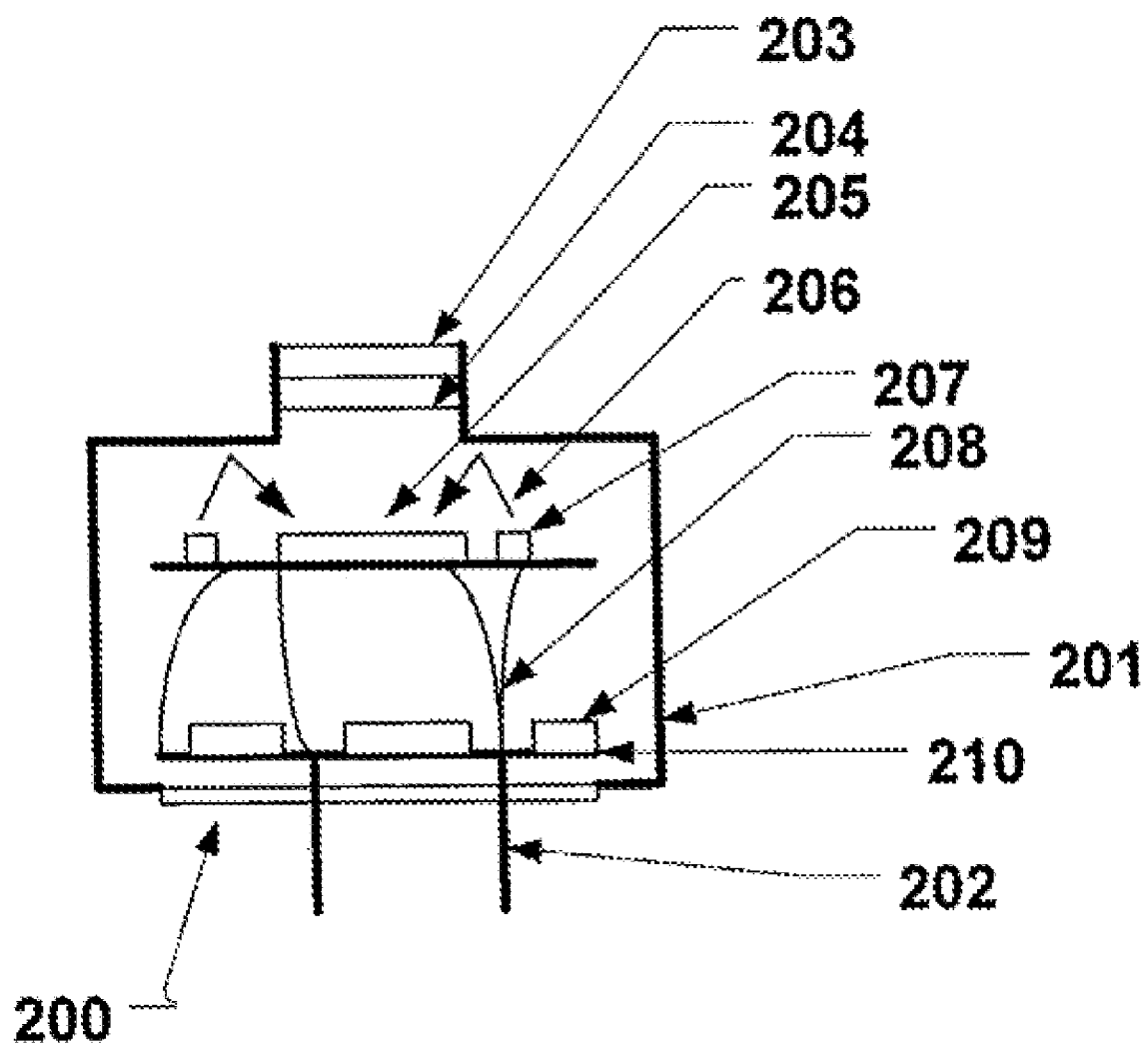
FIG. 3 is a schematic illustration of an alternative embodiment of an optical sensor for detecting are flash conditions.
Figure 4:
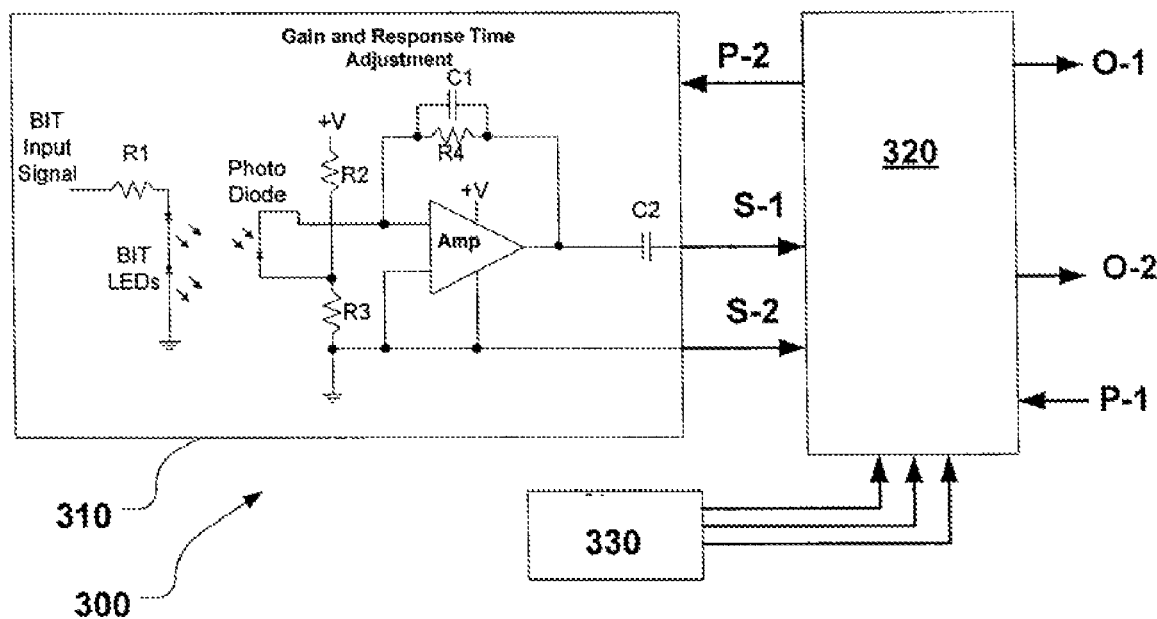
FIG. 4) is a schematic diagram of a sensor system for detecting and responding to arc flash conditions.
Figure 5:
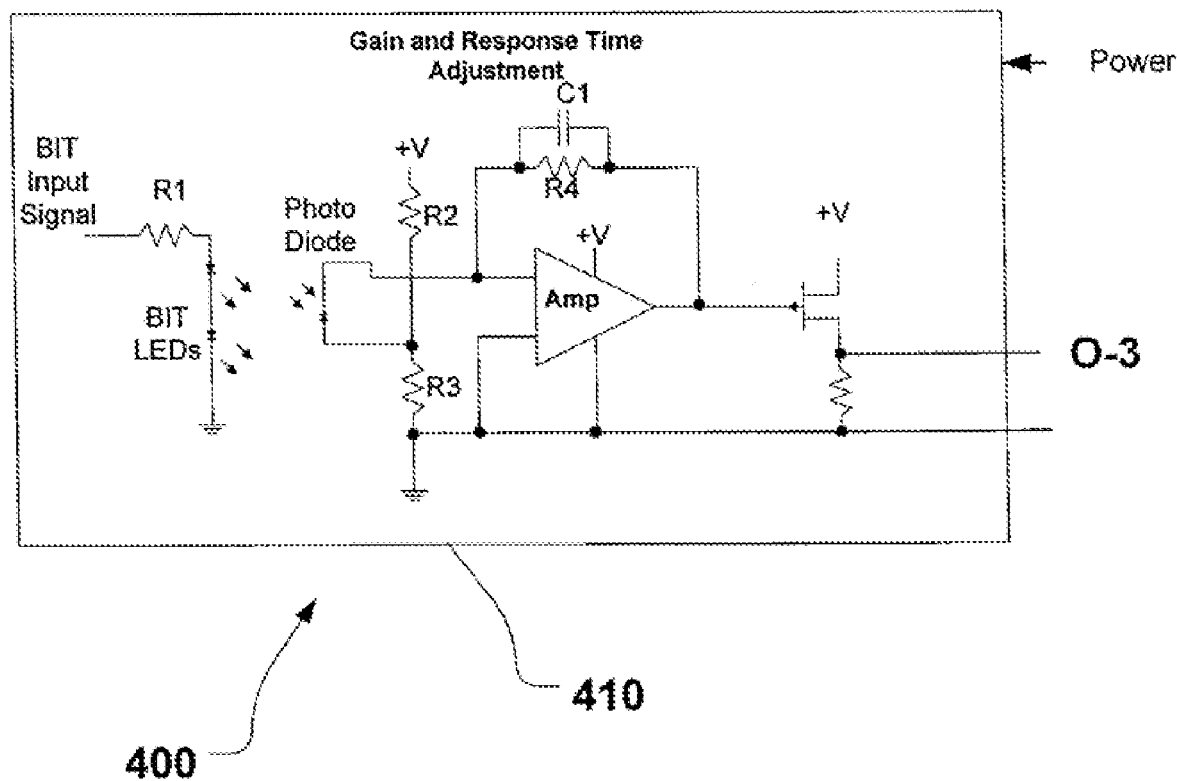
FIG. 5 is a schematic diagram of an alternative embodiment of a sensor system for detecting and responding to arc flash conditions.

Referring now to FIGS. 3, 4 and 5 an alternative embodiment of the invention detects incipient arc flash by detection of characteristic wavelengths of ultraviolet (UV) radiation. This embodiment is operational in frill sunlight and can be used, for example, to detect arcing during daytime and outdoors.

Although the sun produces UV radiation, the shorter wavelengths are largely attenuated by the ozone layer of the atmosphere. Moreover, the light from an arc flash has a higher percentage of short wavelength UV radiation (i.e., about 2000 Å to about 2950 Å) and different spectral characteristics as described below. A sensor adapted to detect short wave UV light is useful to indicate arc flash. More particularly, the sensor 200 of the invention is adapted to be responsive to the wavelengths of light characteristic of vaporized copper which has strong spectral emission lines at about 325 nm. This feature is strongly indicative of an arc flash, which consumes copper (e.g., from copper contacts or wire), as opposed to sunlight, corona flames, incandescent, fluorescent or other sources of light which do not.

The arc moves rapidly, causing its light intensity to vary with time. If the photo diode signal path contains a high pass filter that rejects relatively slow changes in light due to clouds or ambient artificial lights (i.e., the 120 Hz flicker of fluorescent lights) then only light from the are will be amplified. Thus, one can use the DC amplification of the 325 nm light or one can use the AC amplification of the high pass filtered signal to discriminate the arc signal from ambient signals. Alternatively, one can combine both techniques for additional protection from false signals due to changes in the ambient light conditions.

Referring now to FIG. 3, an arc sensor 200 which is "solar blind" is schematically illustrated. By "solar blind" it is meant that the sensor can operate without interference from sunlight. The sensor 200 includes a hermetically sealed housing 201 enclosing an interior space. The housing 201 can be of metal or plastic fabrication as long as it is opaque. A lens or window 203 admits light to the interior, UV filter 204 transmits only UV radiation with a wavelength centered at 325 nm+/−5 nm (i.e., maximum transmission is at about 325 nm n) and ranging from about 300 to about 350 nm. A filter suitable for use in the invention is available from Newport Corporation, Irvine, Calif. By using a filter selectively transmissive of the wavelengths of light characteristic of vaporized copper, are flash is distinguished from other sources of light.

The sensor 200 includes a silicon or silicon carbide photodiode 205 positioned to receive light transmitted through lens 203 and filter 204 and to respond thereto by generating an electrical signal which is transmitted to a circuit board 210 having amplifier(s) 209 and other electronic components. Photodiode 205 is preferably a UV enhanced silicon or a silicon carbide photodiode. Pins 202 are for mechanically and electrically connecting sensor 200 to an arc flash detection system.

Sensor 200 preferably includes a built-in test mechanism (BIT) to confirm that the sensor is functioning. The BIT mechanism includes one or more light emitting diodes (LEDs) 207 which, upon remote command, emit a light beam 206 which is reflected off of the inside of housing 201 and or filter 204 into the photodiode 205. This excites the photodiode so as to provide confirmation that the sensor is operational.

Referring now to FIG. 4 a typical circuit diagram is illustrated for an arc flash detection system 300. The sensor circuitry 310 includes means for gain and response time adjustment including capacitor C1 and resistor R4. R1 is used to set the operating current for the LED. R2 and R3 are used to set the sensitivity and dynamic range of the photo diode. C2 is optional and is present when the circuit is used in an AC amplification mode. C2 is not present when the circuit is used in a DC amplification mode. Appropriate values for the electrical components are readily determined by those skilled in the art.

The analog signals from the sensor circuit 310 are sent via lines S-1 and S-2 to an arc response control unit 320. Additional sensors 330 can also be included in the system 300. Output 0-1 from the are response control unit 320 can be sent to arc flash warning systems such as alarms, flashing lights, sirens etc. Output 0-2 from the arc response control unit 320 can be used for activating protective systems such as circuit breakers. Power is sent to the are response control unit via line P-1 and to the sensor circuit 310 via line P-2.

Referring now to FIG. 5, an alternative arc flash sensor system 400 is illustrated wherein the se sensor circuit 410 provides output 0-3 directly to the circuit breakers to open the circuit breaker in the event of an incipient arc flash. This output can take the form of an analog signal, a logic level signal, a contact closure, or a solid state relay.

The embodiments of the arc flash detection system herein are adapted to detect an arc flash within less than 1 millisecond from the instant of initiation, and to respond thereto within 1 or 2 milliseconds of said detection by sending a signal for de-energizing of the electrical circuit, such that the arc flash is suppressed as quickly as the circuit breakers permit (typically within about 35 milliseconds from initiation).

The pressure-responsive sensor (e.g., sensor 100) and the optical sensor (e.g., sensor 200) can be combined in a parallel arrangement in a system such that activation of either sensor will activate the system to open the circuit breaker(s). This arrangement provides greater back-up for arc flash detection. Alternatively, the sensors 100 and 200 can be combined in series in a system such that both must be activated before the system opens the circuit breaker(s). This arrangement provides added protection against erroneous tripping of the breaker(s) by false positive readings.

While the above description contains many specifics, these specifics are to be considered as exemplification of various embodiments of the invention and not as limitations. Those skilled in the art will envision other embodiments within the scope and spirit of the invention as defined by the claims appended hereto.

What is claimed is:

1. An arc flash detection system comprising:
   a) a sensor for determining and responding to the presence of an arc flash condition in electrical equipment by detecting a pressure rise exceeding 0.01 psi, and ultraviolet radiation characteristic of the arc flash condition, and generating a signal in response thereto; and
   b) processor responsive to said signal for operating a protective system to de-energize the electrical equipment within a predetermined period of time,
   wherein the sensor includes a silicon carbide photodiode, a UV filter for transmitting substantially light having a wavelength in the range of from about 300 to about 350 nm and centered at substantially about 325 nm.

2. The system of claim 1 wherein the sensor includes a pressure sensing transducer.

3. The system of claim 2 wherein the transducer is an absolute pressure sensing transducer.

4. The system of claim 3 wherein the processing means includes a microprocessor with a clock for determining a rate of pressure rise, and the sensor detects and responds to a rate of pressure rise exceeding 0.05 psi/millisecond.

5. The system of claim 2 wherein the sensor includes a differential pressure sensing transducer or a differential pressure switch.

6. The system of claim 5 wherein the differential pressure sensing transducer detects the difference in the pressure inside of a compartment in which the electrical equipment is housed and the ambient pressure outside of the compartment.

7. The system of claim 5 wherein the sensor is positioned in the interior of a compartment in which the electrical equipment is housed and includes a chamber at least partially defined by a wall, said wall having a first orifice which impedes relatively rapid inflow of air from the interior of the compartment into the chamber, but allows relatively slow outflow of air from inside the chamber to the interior of the compartment, said differential pressure sensing transducer being positioned at a second orifice in the wall so as to detect a difference in pressure between the air inside the chamber and the air in the interior of the compartment.

8. The system of claim 1 wherein the processing means includes at least one of a microprocessor, differential amplifier, level detector, Schmitt trigger, comparator, or a pressure switch.

9. The system of claim 1 wherein the processing means includes communication means to transmit operational instructions to the protective system.

10. The system of claim 1 wherein the protective system includes a circuit breaker.

11. The system of claim 1 wherein the sensor includes a test mechanism including at least one LED for verifying the operability of the sensor.

12. A method for detecting and suppressing an arc flash condition in electrical equipment comprising:
   a) verifying the presence of an incipient arc flash condition by detecting (i) a pressure increase which exceeds a predetermined threshold of rate of pressure rise, and difference between the pressure inside a compartment housing the electrical equipment and the pressure outside the compartment, and (ii) UV radiation having a wavelength characteristic of arc flash, and (iii) a rapidly changing light signal characteristic of arc motion;
   b) generating a signal in response to said verification; and
   c) de-energizing the electrical equipment in response to said signal,
   wherein verifying the presence of an incipient arc flash comprises selective detection of the presence of UV radiation having a wavelength of 325 nm.

13. The method of claim 12 wherein verifying the presence of an incipient arc flash condition comprises detecting a pressure increase greater than 0.01 psi occurring within a predetermined period of time or a rate of pressure rise exceeding 0.05 psi/millisecond.

* * * * *